US007164380B2

(12) United States Patent
Saito

(10) Patent No.: US 7,164,380 B2
(45) Date of Patent: Jan. 16, 2007

(54) INTERROGATOR AND GOODS MANAGEMENT SYSTEM ADOPTING THE SAME

(75) Inventor: Takeshi Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 837 days.

(21) Appl. No.: 09/942,723

(22) Filed: Aug. 31, 2001

(65) Prior Publication Data

US 2002/0175804 A1 Nov. 28, 2002

(30) Foreign Application Priority Data

May 22, 2001 (JP) ............................. 2001-152027

(51) Int. Cl.
G01S 13/74 (2006.01)
H01Q 9/04 (2006.01)
G01S 13/00 (2006.01)

(52) U.S. Cl. ........................ 342/42; 342/43; 342/44; 342/51; 342/175; 342/195; 343/790

(58) Field of Classification Search ............ 342/29–51, 342/175, 195; 343/790–792, 795; 340/501, 340/505, 10.1–10.6, 870.18, 568.1, 572.1–572.9
See application file for complete search history.

(56) References Cited

U.S. PATENT DOCUMENTS

| | | | | |
|---|---|---|---|---|
| 2,706,778 A | * | 4/1955 | Walters ....................... | 343/790 |
| 3,366,962 A | * | 1/1968 | Kulik et al. ................. | 343/790 |
| 3,720,940 A | * | 3/1973 | Fox et al. ..................... | 342/44 |
| 3,745,569 A | * | 7/1973 | Works et al. ................ | 342/44 |
| 3,774,205 A | * | 11/1973 | Smith et al. ................... | 342/44 |
| 3,798,654 A | * | 3/1974 | Martino et al. ............. | 343/745 |
| 3,859,652 A | * | 1/1975 | Hall et al. ................ | 340/572.3 |
| 3,944,928 A | * | 3/1976 | Augenblick et al. ...... | 340/572.2 |
| 3,945,013 A | * | 3/1976 | Brunner et al. ............. | 343/791 |

(Continued)

FOREIGN PATENT DOCUMENTS

JP 2-32174 8/1988

(Continued)

OTHER PUBLICATIONS

"Antenne verticale a jupe"; no author listed; no date listed; posted on the internet at perso.wanadoo.fr; accessed on Apr. 26, 2005.*

(Continued)

Primary Examiner—Bernarr E. Gregory
(74) Attorney, Agent, or Firm—Reed Smith LLP; Stanley P. Fisher, Esq.; Juan Carlos A. Marquez, Esq.

(57) ABSTRACT

An interrogator with an antenna that allows information exchanges with multiple transponders in a shorter distance of communication, by securing an intensified and uniform electromagnetic energy concentrated on areas near antenna elements. The interrogator is furnished with a sleeve antenna that includes a monopole conductor of ¼ wavelength (free space wavelength) continuously connected to a core wire of a coaxial cable on one end thereof, and a feed point on the other end, in which the sleeve antenna is grounded at the feed point. The interrogator has a plurality of the transponders arrayed near the antenna, and a plurality of the antennas selected by RF signal selectors. The interrogator antenna allows movable body identification such as in a goods management system for identifying multiply arrayed goods.

13 Claims, 15 Drawing Sheets

U.S. PATENT DOCUMENTS

| | | | | |
|---|---|---|---|---|
| 4,331,957 | A * | 5/1982 | Enander et al. | 342/51 |
| 4,388,524 | A * | 6/1983 | Walton | 342/44 |
| 4,471,344 | A * | 9/1984 | Williams | 340/572.2 |
| 4,510,495 | A * | 4/1985 | Sigrimis et al. | 340/10.34 |
| 4,654,658 | A * | 3/1987 | Walton | 340/10.4 |
| 4,656,472 | A * | 4/1987 | Walton | 340/10.4 |
| 4,663,625 | A * | 5/1987 | Yewen | 340/10.42 |
| 4,724,427 | A * | 2/1988 | Carroll | 340/10.52 |
| 4,739,328 | A * | 4/1988 | Koelle et al. | 342/44 |
| 5,124,699 | A * | 6/1992 | Tervoert et al. | 340/10.2 |
| 5,252,984 | A * | 10/1993 | Dorrie et al. | 343/791 |
| 5,461,386 | A * | 10/1995 | Knebelkamp | 342/44 |
| 5,550,547 | A * | 8/1996 | Chan et al. | 342/42 |
| 5,557,280 | A * | 9/1996 | Marsh et al. | 342/44 |
| 5,561,430 | A * | 10/1996 | Knebelkamp | 342/44 |
| 5,598,174 | A * | 1/1997 | Erkocevic et al. | 343/795 |
| 5,627,517 | A * | 5/1997 | Theimer et al. | 340/572.1 |
| 5,640,151 | A * | 6/1997 | Reis et al. | 340/10.2 |
| 5,640,164 | A * | 6/1997 | Gunnarsson | 340/10.34 |
| 5,648,765 | A * | 7/1997 | Cresap et al. | 340/10.4 |
| 5,652,598 | A * | 7/1997 | Campbell et al. | 343/791 |
| 5,786,998 | A * | 7/1998 | Neeson et al. | 342/42 |
| 5,787,174 | A * | 7/1998 | Tuttle | 342/44 |
| 5,995,019 | A * | 11/1999 | Chieu et al. | 340/10.32 |
| 6,150,921 | A * | 11/2000 | Werb et al. | 340/10.1 |
| 6,184,841 | B1 * | 2/2001 | Shober et al. | 342/44 |
| 6,353,406 | B1 * | 3/2002 | Lanzl et al. | 340/10.1 |
| 6,356,230 | B1 * | 3/2002 | Greef et al. | 342/44 |
| 6,362,737 | B1 * | 3/2002 | Rodgers et al. | 340/10.1 |
| 6,380,845 | B1 * | 4/2002 | Tuttle | 340/10.4 |
| 6,396,438 | B1 * | 5/2002 | Seal | 342/42 |
| 6,405,102 | B1 * | 6/2002 | Swartz et al. | 342/51 |
| 6,483,427 | B1 * | 11/2002 | Werb | 340/10.1 |
| 6,549,119 | B1 * | 4/2003 | Turner | 340/10.5 |
| 6,552,661 | B1 * | 4/2003 | Lastinger et al. | 342/44 |
| 6,577,266 | B1 * | 6/2003 | Axline | 342/42 |
| 6,593,845 | B1 * | 7/2003 | Friedman et al. | 340/10.33 |
| 6,611,224 | B1 * | 8/2003 | Nysen et al. | 342/42 |
| 6,611,556 | B1 * | 8/2003 | Koerner et al. | 340/10.52 |
| 6,745,008 | B1 * | 6/2004 | Carrender et al. | 342/42 |

FOREIGN PATENT DOCUMENTS

WO    WO98/21691    11/1997

OTHER PUBLICATIONS

"Antenna Sysatem Guide, NIJ Guide 202-00", U.S. Department of Justice, National Institute of Justice, Law Enforcement and Corrections Standarda and Testing Program, 3 cover pages and pp. 17-26.

* cited by examiner

FIG. 5(a)
FIG. 5(b)
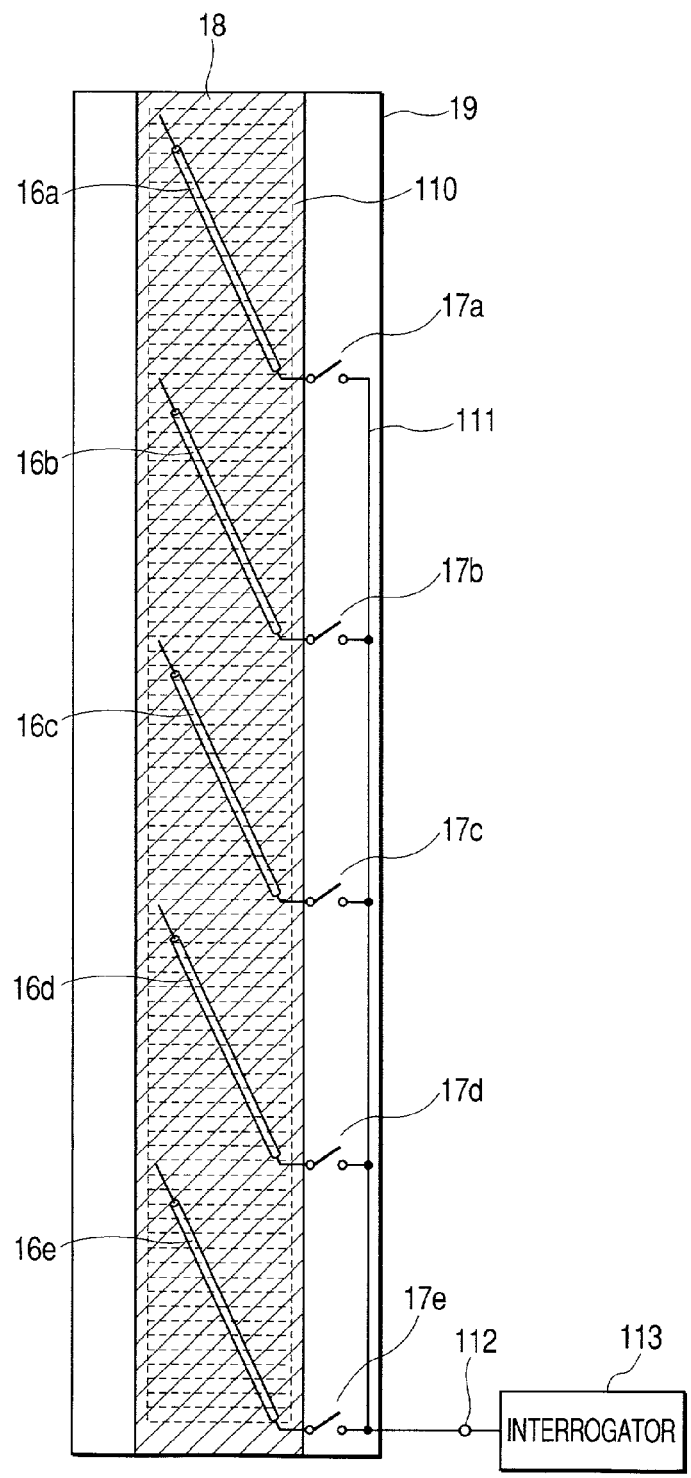
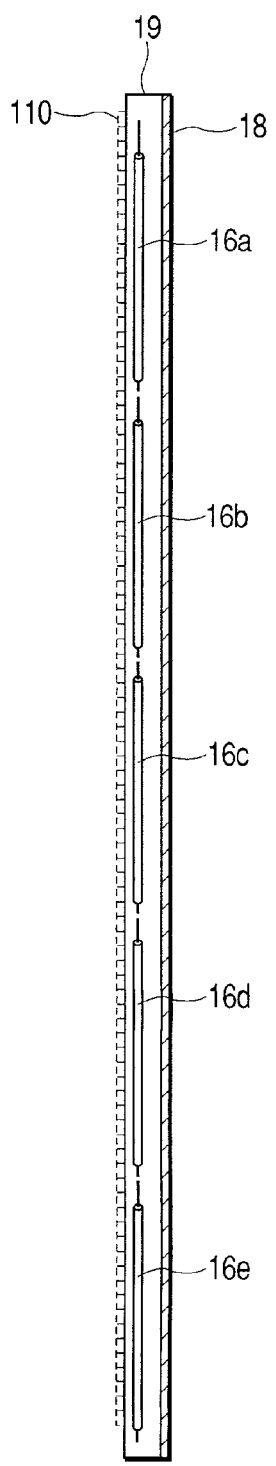

FIG. 6(a)
FIG. 6(b)
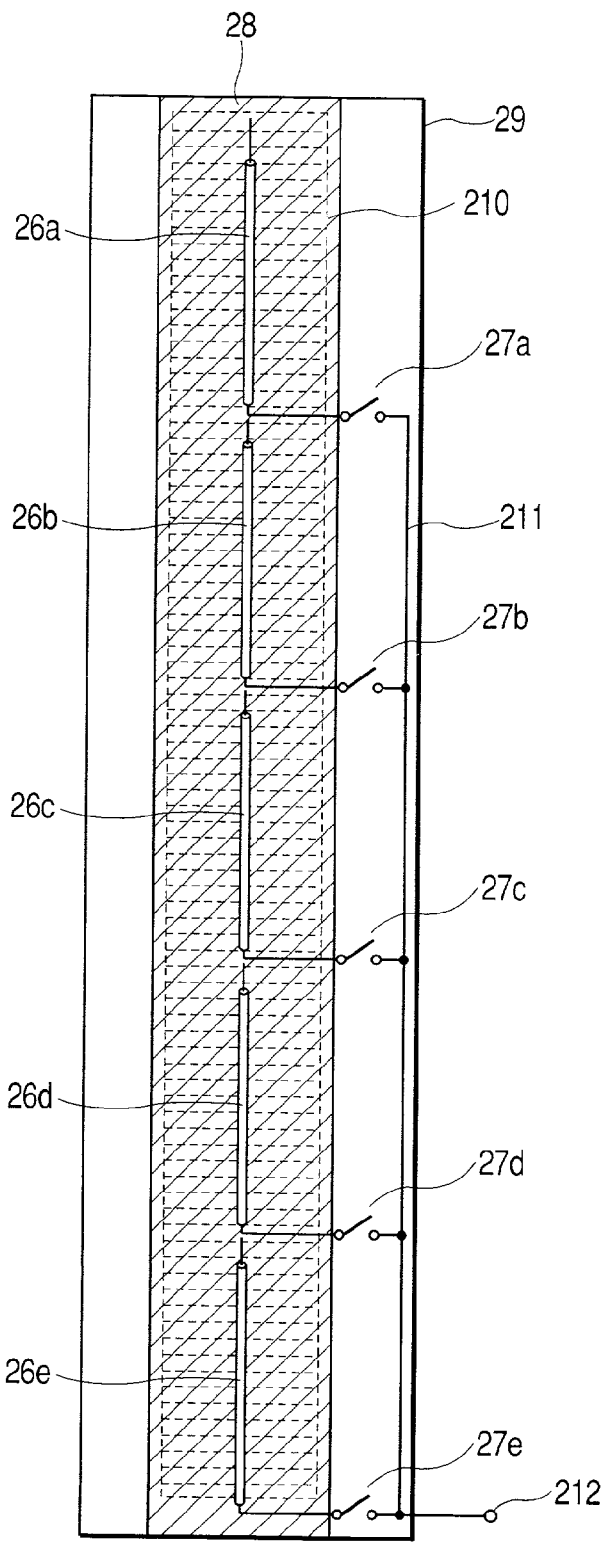
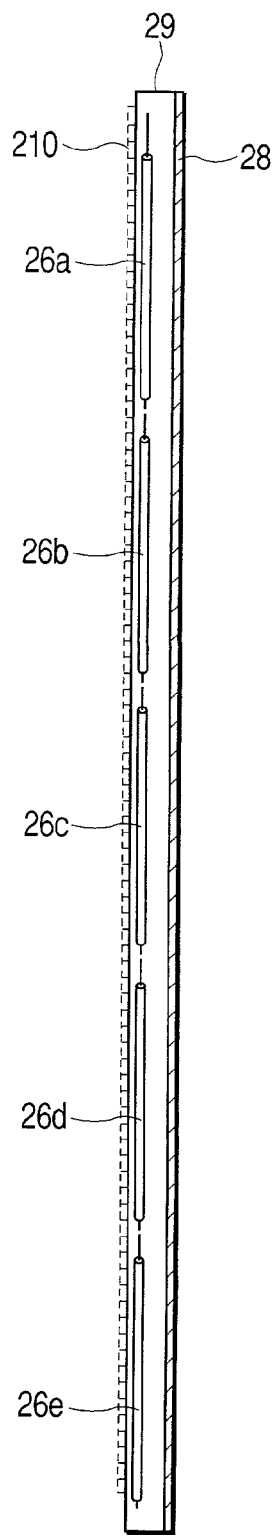

FIG. 16(a)
FIG. 16(b)
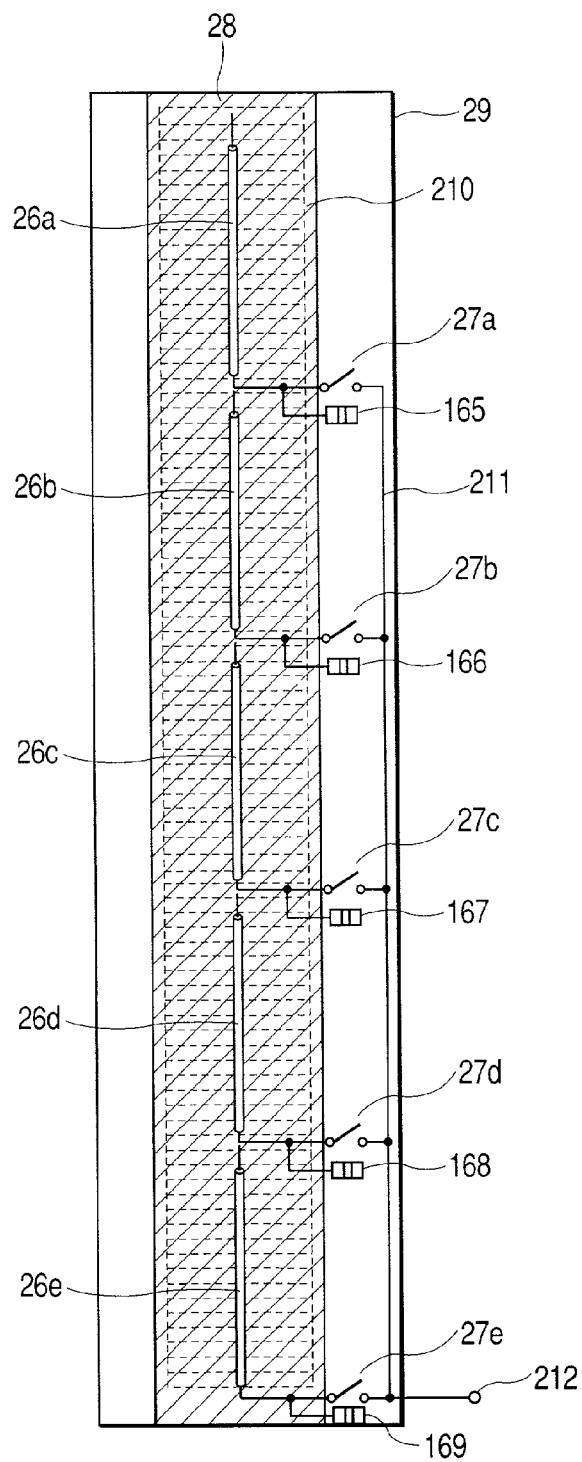
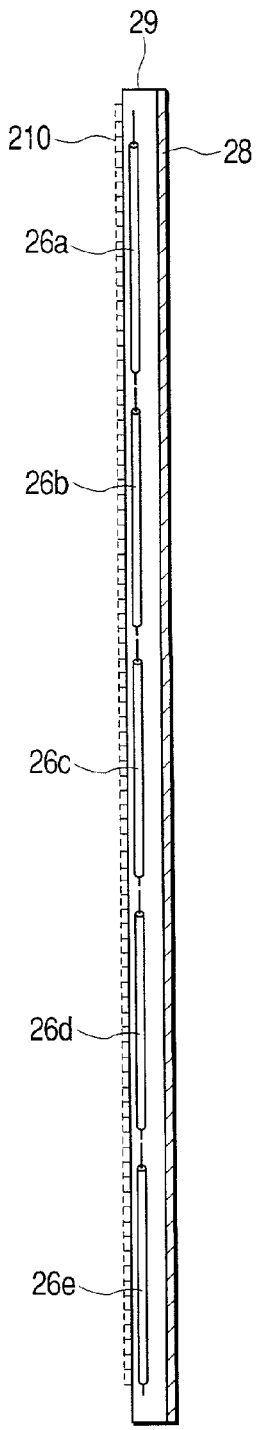

INTERROGATOR AND GOODS MANAGEMENT SYSTEM ADOPTING THE SAME

BACKGROUND OF THE INVENTION

The present invention relates to an interrogator that exchanges information with transponders by using an RF signal of the microwave band, specifically to an interrogator provided with antennas suitable for exchanging RF signals with multiple transponders.

Movable body identification equipment (identification system by radio waves) is composed of an interrogator and plural transponders responding to the interrogator. The interrogator radiates an RF signal of the microwave band (including the quasi-microwave band) from an antenna to the transponders not having the cells, and exchanges information with the transponders. The transponders receive the RF signal from the interrogator with small antennas, and rectify the RF signal to attain the DC power supply, clocks and data, and in response to the data, answer the information of the memory to the interrogator from the small antennas.

The exchange of information includes, for example, discrimination of identification numbers different in each of the transponders. In this case, applying the transponders on articles such as packages will achieve a system that discriminates the packages being carried on a belt conveyer, without using human hands (for example, refer to International Publication No. WO98/21691).

The distance of communication within which the information exchange is possible between the interrogator and the transponders is determined depending on the antenna and the power of an RF transmitting signal that the interrogator generates, in case of the capability and the shape and size of the transponders being constant. If the antenna is a phased array antenna that is synthesized with multiple antenna elements, the distance of communication will be prolonged. If the antenna is an antenna with single element, the communication area will be limited within an area near the antenna; thus, the antenna structure of the interrogator limits the range of the distance of communication. A traveling wave antenna is used, for example, in equipment having the transponders applied to the examination of tickets, which discriminates the transponders one by one (refer to Japanese Utility Model Laid-open (Kokai) No. Hei 2-32174).

SUMMARY OF THE INVENTION

In a case where a single interrogator is desired to secure communications with as many transponders as possible, an antenna configuration for the interrogator that allows an array of multiple transponders within a communication area becomes essential.

However, in a quasi-microwave band, for example, a phase synthesis of an electromagnetic wave radiated from the interrogator and electromagnetic waves radiated from the transponders in the space is apt to create fluctuations of the electromagnetic waves; and it is difficult to realize a uniform electromagnetic field over a wide range. Further, if plural transponders are arrayed close to each other, the mutual coupling between the antennas will disturb the radiation characteristic to thereby deteriorate the antenna characteristic, which makes it difficult to attain the power that the transponders need.

The present invention has been made in view of the foregoing circumstances, and it provides an interrogator having an antenna that secures an intensified and uniform electromagnetic energy concentrated on areas near antenna elements and thereby achieves an array of multiple transponders in a shorter distance of communication, and a goods management system applying the same.

In order to solve the problem of the invention, the interrogator is furnished with a sleeve antenna that includes a monopole conductor of ¼ wavelength (free space wavelength) continuously connected to a core wire of a coaxial cable on one end thereof, and a feed point on the other end, in which the sleeve antenna is grounded at the feed point. An antenna having such a physical makeup generates an electromagnetic field on an outer conductor of the coaxial cable, and by setting the part of the coaxial cable to a length of some wavelengths, the part functions as an antenna. Accordingly, it becomes possible to array plural transponders in an area covering a length of some wavelengths from the open end of the sleeve antenna.

First, the general characteristic of a sleeve antenna will be discussed. FIG. 1 illustrates a basic configuration of the monopole antenna. The antenna includes a monopole in which the coaxial cable having a core wire 1 and a dielectric substance 3 and an outer conductor 2 extends the core wire 1 from the open end by a length of about ¼ wavelength of the free space wavelength, which is excited by a signal source 5. And, it is idealistic that an infinite ground plane 4 is formed vertically to the monopole antenna including the open end.

The radio wave radiated from a monopole antenna having this sort of configuration has a voltage distribution V, a current distribution Cl, and a radiation pattern P between the core wire 1 (monopole antenna) and the ground plane 4, as shown in FIG. 2. The radiation pattern P is formed at the symmetric position to the monopole antenna 1.

Here, as shown in FIG. 3, if the grounding is made at a feed point 14, the ground plane will move to the feed point 14, and varies the voltage and current distributions on the antenna. The signal from the signal source 5 is transmitted through the coaxial cable, and resonates at the signal source frequency on the monopole portion 1 to radiate an electromagnetic wave. At that moment, the outer conductor 2 of the coaxial cable has a voltage or current excited, which forms a current distribution C2 shown in FIG. 4. FIG. 4 illustrates an equivalent characteristic of the antenna shown in FIG. 3. In the monopole antenna shown in FIG. 1, only the equivalent portion to the ¼ wavelength functions as an antenna; however, in the sleeve antenna shown in FIG. 3, on the portion of the outer conductor 2 of the coaxial cable is created a voltage or current distribution, whereby the electromagnetic wave is radiated from the outer conductor 2 as well. That is, the whole structure including the monopole antenna and the coaxial cable portion functions as an antenna. The invention adopts the sleeve antenna shown in FIG. 3.

Thus, in the sleeve antenna shown in FIG. 3, an intensified and uniform electromagnetic energy is securely attained to be concentrated on areas near the monopole antenna and the coaxial cable portion. Accordingly, multiple transponders can be arrayed in that area. In other words, even if the antenna characteristics of the transponders are deteriorated, or even if the electromagnetic distributions are different in the fluctuations, the areas adjacent to the antenna elements attain an intensified electromagnetic field, which makes it possible to secure the electromagnetic energy over a wide area that the individual transponders need.

Here, the electromagnetic wave radiated by the antenna shown in FIG. 3 is spread all around the circumference of the coaxial cable. Therefore, in case of using the microwave band, it is effective to form a physical makeup such that the antenna is disposed close to a ground plane though a thin dielectric layer (or film) less than few millimeters, and the electromagnetic wave radiated toward the ground plane is reflected by the ground plane to radiate on the other side of the ground plane. In consequence, the electromagnetic energy supplied to the transponders can be increased.

BRIEF DESCRIPTION OF THE DRAWINGS

Preferred embodiments of the present invention will be described in detail based on the followings, wherein:

FIG. 5(a) illustrates a plan view that explains an interrogator as the first embodiment relating to the invention;

FIG. 5(b) illustrates a side view that explains an interrogator as the first embodiment relating to the invention;

FIG. 6(a) illustrates a plan view that explains an interrogator as the second embodiment relating to the invention;

FIG. 6(b) illustrates a side view that explains an interrogator as the second embodiment relating to the invention;

FIG. 16(a) illustrates a plan view that explains an interrogator as the eighth embodiment relating to the invention; and FIG. 16(b) illustrates a side view that explains an interrogator as the eighth embodiment relating to the invention.

DETAILED DESCRIPTION OF PREFERRED EMBODIMENTS

An interrogator relating to the invention and a goods management system applying the same will be discussed further in detail with reference to some embodiments shown in the accompanying drawings.

Figure 1:
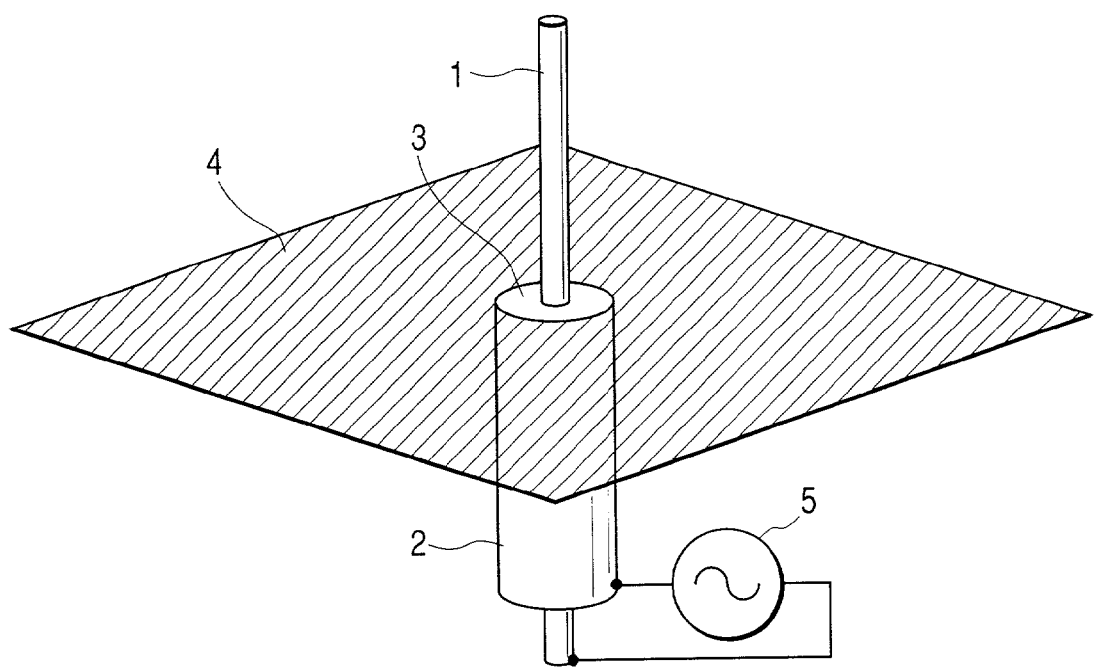
FIG. 1 is a chart explaining a configuration of a monopole antenna.
Figure 2:
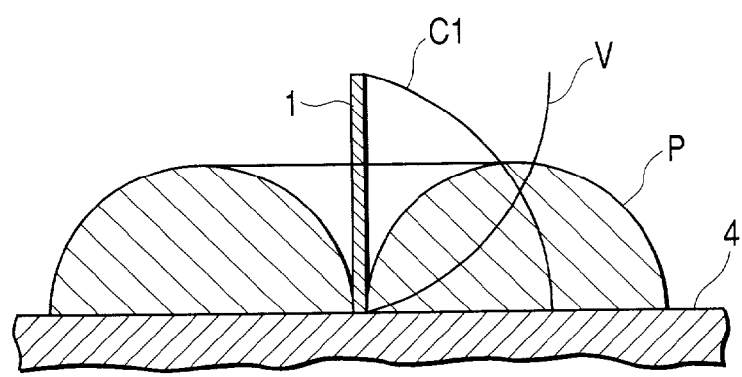
FIG. 2 is a chart explaining a current/voltage distribution of the monopole antenna and a radiation pattern of an electromagnetic wave.
Figure 3:
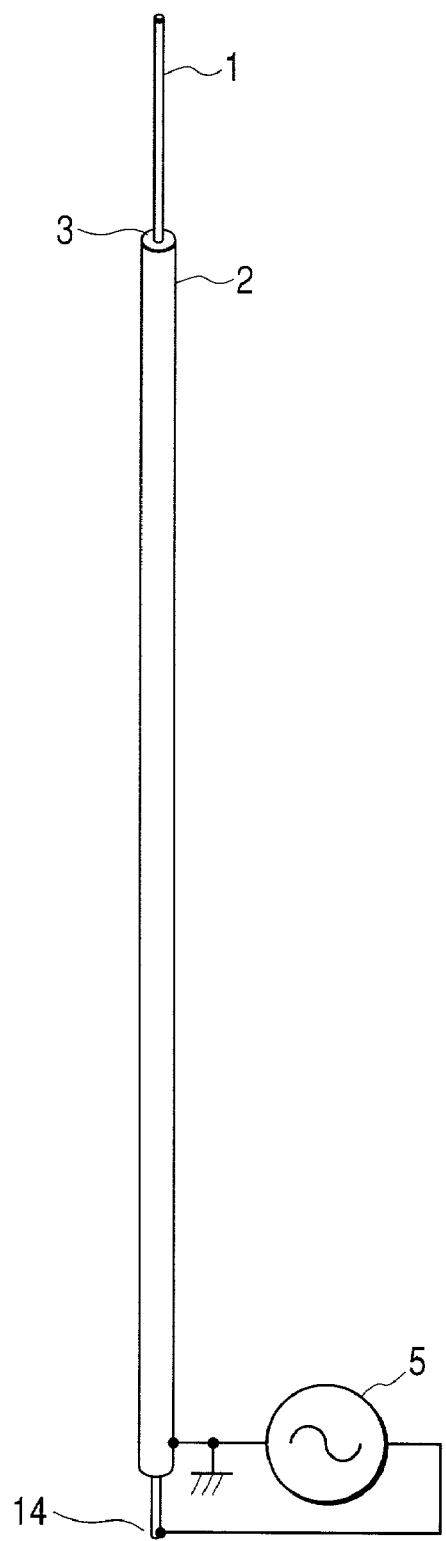
FIG. 3 is a chart explaining a configuration of a sleeve antenna.
Figure 4:
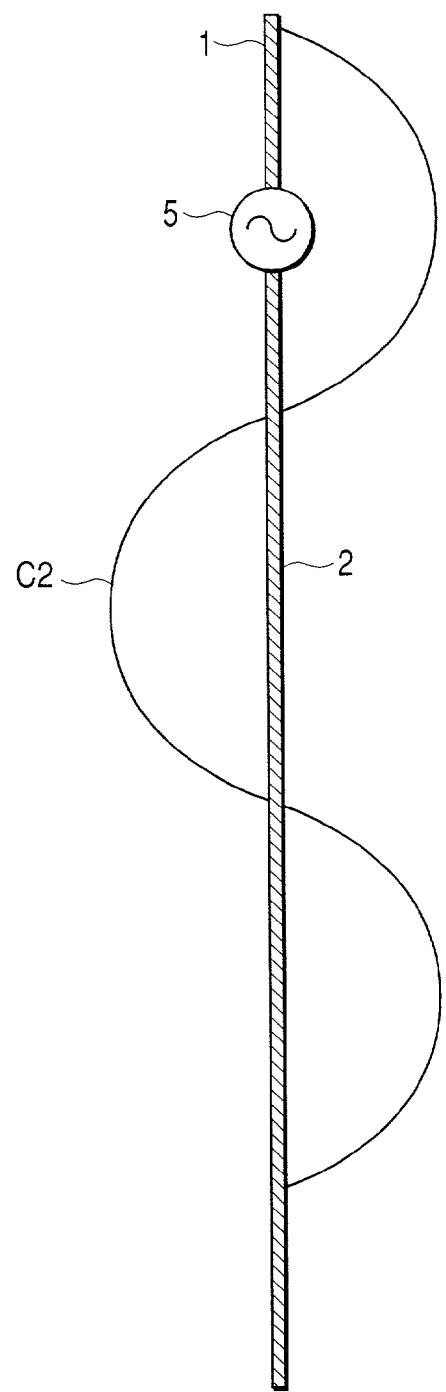
FIG. 4 is a chart explaining a current distribution of the sleeve antenna.

FIGS. 5(a) and 5(b) illustrate an interrogator as the first embodiment of the invention, which includes plural sleeve antennas switched by selectors and plural transponders arrayed near each of the sleeve antennas, and manages multiple transponders as a whole. FIG. 5(a) is the plan view and FIG. 5(b) is the side view. In FIGS. 5(a) and 5(b), 16a–16e denote the sleeve antennas as shown in FIG. 3, 113 denotes an interrogator body, 111 an RF signal line that supplies the sleeve antennas 16a–16e with an RF signal from the interrogator body 113 through an input/output terminal 112, and 17a–17e denote RF signal selectors that switch the connections between each of the sleeve antennas and the RF signal line 111. Each of the sleeve antennas has the outer conductor grounded at the feed point. Further, 19 denotes a dielectric plate, and 18 a conductive plate (ground plane) stuck on the rear side of the dielectric plate 19. The above construction forms an interrogator antenna incorporated with the interrogator body 113.

Further, in FIGS. 5(a) and 5(b), 110 denotes a transponder group disposed on the front side of the dielectric plate 19, very close to the sleeve antennas 16a–16e. Each of the transponders forms a long and narrow plane rectangle, and in a practical use, it is stuck on the side face of an article in stock control, for example. FIGS. 5(a) and 5(b) omit to illustrate the articles, and shows the state that the rectangular transponders put on all the articles in stock control are arranged.

Each of the rectangular transponders incorporates a rectangular-shaped antenna and an IC chip. The IC chip includes a rectifier that rectifies an RF signal from the antenna to generate a DC voltage, a receiving circuit that extracts clocks and data, etc., from the RF signal, a memory that stores information such as the identification number of its own, and a transmitting circuit that transmits the information of the memory in accordance with the received data, using the received RF signal.

Further, the interrogator body 113 includes a transmitting circuit that modulates data for interrogation into an RF signal, and a receiving circuit that receives a signal transmitted from a transponder and extracts information.

The sleeve antennas 16a–16e are disposed inside the dielectric plate 19, with such a degree of spacing that the antennas do not come in direct contact with the transponder group 110 electrically mechanically.

The ground plane 18 is placed close to the sleeve antennas 16a–16e, on the side opposite to the transponder group 110; and, it reflects the radio waves that the sleeve antennas radiate to the transponder group 110 so as to increase the power supplied thereto.

As shown in FIGS. 5(a) and 5(b), the sleeve antennas 16a–16e are disposed slant to the dielectric plate 19. When the sleeve antennas 16a–16e have such an angle in the layout, and each of the transponder antennas has the linearly polarized wave, the plane of vibration of the linearly polarized wave of the transponder antennas moves in close to the plane of vibration of the linearly polarized wave of the sleeve antennas 16a–16e (to the longitudinal direction of the antennas), which raises the power for exchanging the RF signals.

When each of the transponder antennas has the plane of vibration of the linearly polarized wave in the longitudinal direction along the rectangular shape of the transponder, the RF signal can be exchanged at the maximum efficiency by bringing the plane of vibration into coincidence with the longitudinally directional plane of vibration of the sleeve antennas. However, since the number of the transponders that one sleeve antenna can communicate with decreases in that case, it is effective to lay out the sleeve antennas with an angle as shown in FIGS. 5(a) and 5(b), thereby increase the number of the transponders, even with a slight decrease of the efficiency.

This embodiment achieves an interrogator with antennas that enables multiple arrangements of the transponders.

FIGS. 6(a) and 6(b) illustrate an interrogator as the second embodiment of the invention, in which the sleeve antennas are arranged in the longitudinal direction of the dielectric plate. FIG. 6(a) and FIG. 6(b) are the plan view and the side view, respectively. In FIGS. 6(a) and 6(b), 26a–26e denote the sleeve antennas disposed in parallel to the longitudinal direction of a dielectric plate 29. The other configuration is the same as in the first embodiment. That is, the sleeve antennas 26a–26e, RF signal selectors 27a–27e, RF signal line 211, RF signal input/output terminal 212, and ground plane 28 configure an interrogator antenna, and a transponder group 210 is disposed very close to the sleeve antennas 26a–26e. Here, the interrogator body is omitted in the drawing.

The sleeve antennas 26a–26e in the second embodiment have the plane of vibration perpendicular to the plane of vibration of the rectangular transponder antennas. This configuration of the plane of vibration of the transponders being perpendicular to that of the sleeve antennas weakens the impedance coupling between the sleeve antennas and the transponder antennas, and decreases the power to be supplied. However, in reverse, the load is apt to be lessened each other, and thereby the optimization of the distance between them will realize an interrogator with the sleeve antennas capable of communicating multiple transponders.

Figure 7A:
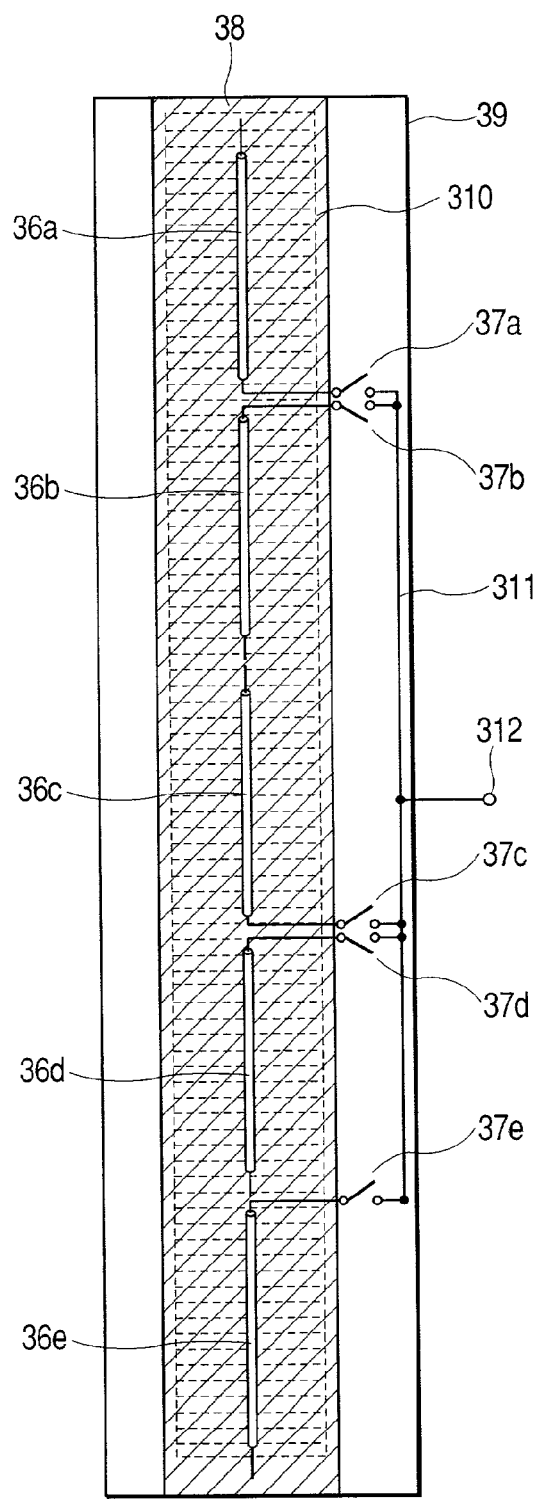
FIG. 7(a) illustrates a plan view that explains an interrogator as the third embodiment relating to the invention.
Figure 7B:
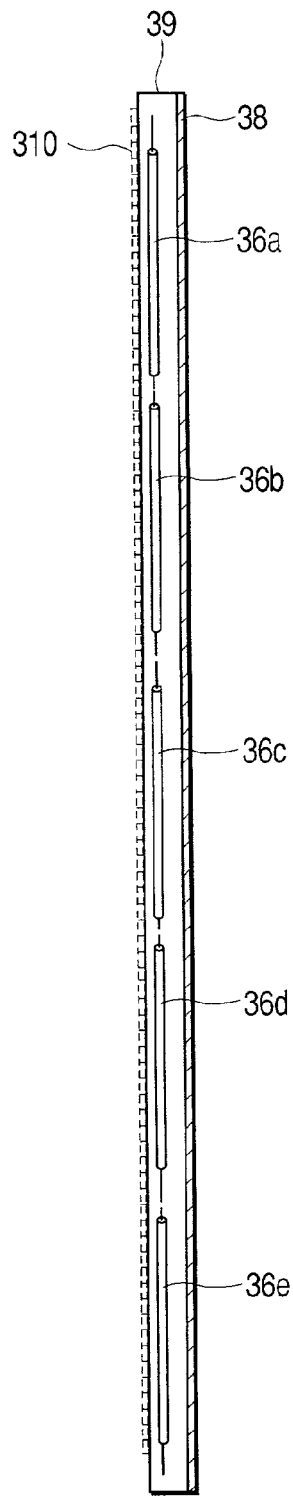
FIG. 7(b) illustrates a side view that explains an interrogator as the third embodiment relating to the invention.

FIGS. 7(a) and 7(b) illustrate an interrogator as the third embodiment of the invention, in which the sleeve antennas are disposed to shorten the RF signal line for the power distribution. FIG. 7(a) and FIG. 7(b) are the plan view and the side view, respectively. To shorten the RF signal line is to decrease the loss of the RF signal generated.

In FIGS. 7(a) and 7(b), 36a–36e denote the sleeve antennas disposed with the orientations reversed each other, in parallel to the longitudinal direction of a dielectric plate 39. 311 denotes an RF signal line that feeds the RF signal to the antennas arranged in that manner, 312 an RF signal input/output terminal arranged virtually on the center of the RF signal line 311. The other configuration is the same as in the second embodiment. That is, the sleeve antennas 36a–36e, RF signal selectors 37a–37e, RF signal line 311, RF signal input/output terminal 312, and ground plane 38 configure an interrogator antenna, and a transponder group 310 is disposed very close to the sleeve antennas 36a–36e. Here, the interrogator body is omitted in the drawing.

The third embodiment has the advantage of reducing the RF signal loss generated in the RF signal line 311, by arranging the sleeve antennas 36a–36e with the orientations changed so as to shorten the length of the RF signal line 311, and integrating the RF signal selectors 37a and 37b, and 37c and 37d each into one IC package.

Figure 8:
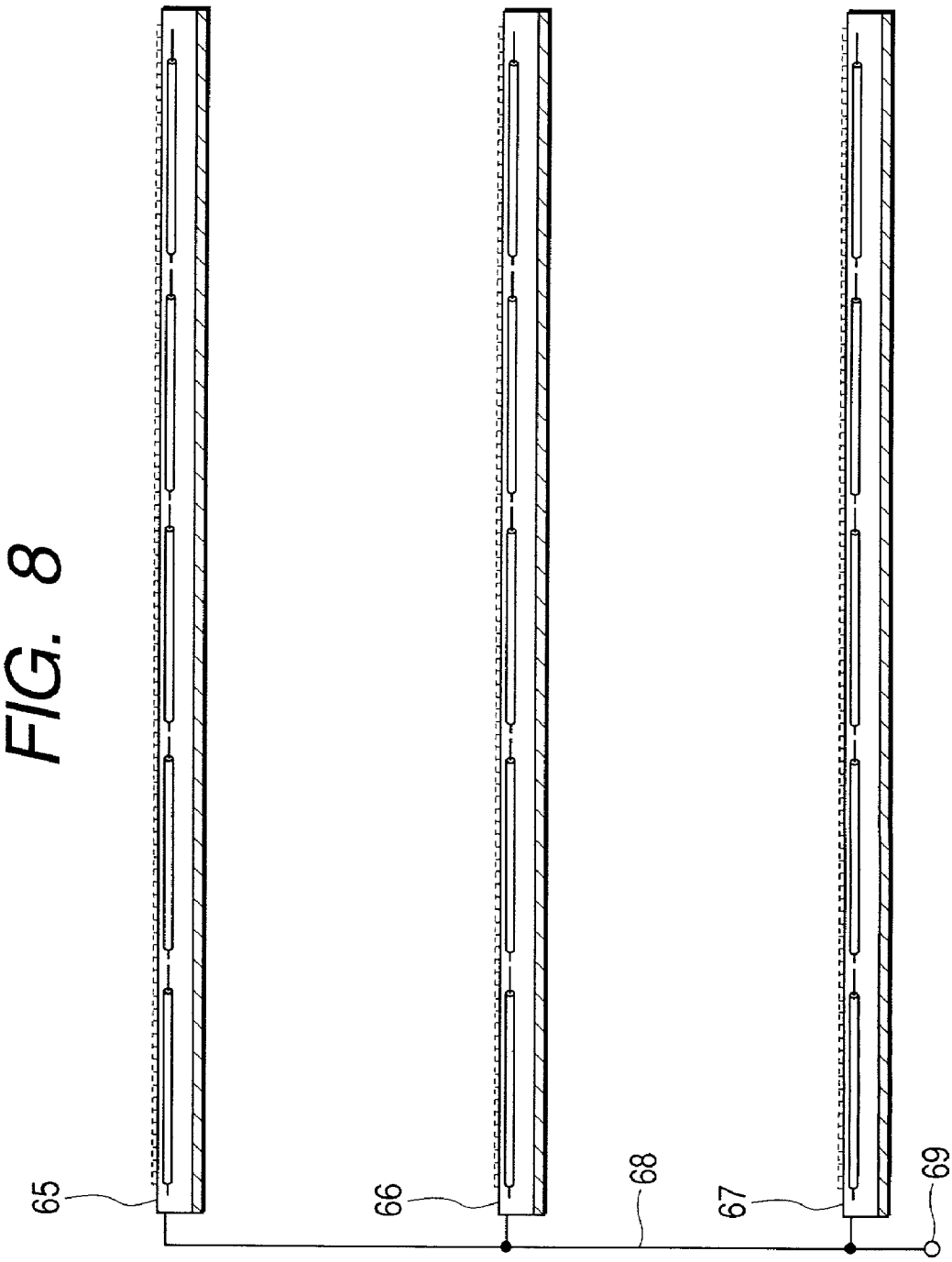
FIG. 8 is a side view that explains an interrogator as the forth embodiment relating to the invention.

FIG. 8 illustrates an interrogator as the fourth embodiment of the invention, in which the interrogator antennas of the first, the second, or the third embodiment are connected in parallel. In FIG. 8, 65, 66, 67 each denote the interrogator antenna as shown in either of FIGS. 5(a) and 5(b)–FIGS. 7(a) and 7(b) (hereafter, this will be mentioned as antenna group). 68 denotes an RF signal line 311, 69 an RF signal input/output terminal of the interrogator antenna in this embodiment. The interrogator antenna in this embodiment uses a plurality of the antenna groups shown in either of FIGS. 5(a) and 5(b)–FIGS. 7(a) and 7(b), so that the processable number of the transponders can further be increased.

Here, to increase of the number of the parallel connections elongates the RF signal line 68, and increases the RF signal loss; however, if the output power of the RF signal of the interrogator body is high, or if the receiving sensitivity of each transponder is high, the permissible RF signal loss will be high, and the number of the parallel connections will become possible to increase, without being limited to three in FIG. 8.

Figure 9:
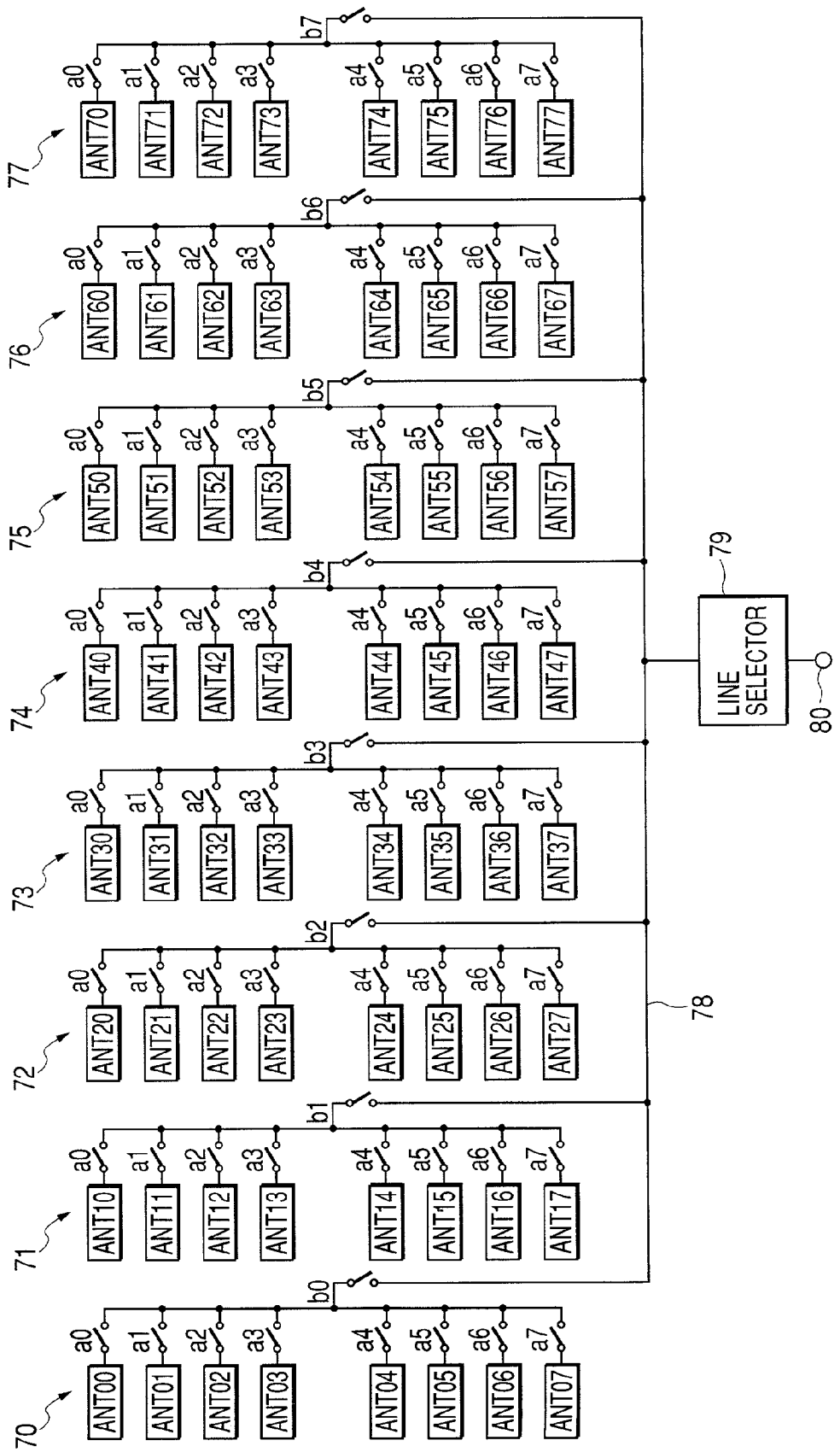
FIG. 9 is a chart explaining a configuration of an interrogator as the fifth embodiment of the invention.

FIG. 9 illustrates an interrogator as the fifth embodiment of the invention, which is provided with the RF signal selectors for each of the antenna groups. In FIG. 9, 70–77 signify antenna groups shown in either of FIGS. 5(a) and 5(b)–FIGS. 7(a) and 7(b), ANTk0–ANTk07 (k=0–7) sleeve antennas that the antenna group 7k includes, a0–a7 RF signal selectors furnished with each of the sleeve antennas, b0–b7 RF signal selectors furnished with each of the antenna groups 70–77, 78 an RF signal line that supplies the RF signal to the RF signal selectors b0–b7, 79 an RF signal line controller that controls the connection/disconnection of the RF signal selectors a0–a7 and the RF signal selectors b0–b7, and 80 an RF signal input/output terminal of the interrogator antenna of this embodiment.

The interrogator antenna of this embodiment uses 64 sleeve antennas in total, one of which is selected in accordance with the operation of the RF signal selectors a0–a7 and the RF signal selectors b0–b7 and is connected to the RF signal line 78, which is controlled by the RF signal line controller 79.

In this embodiment, since each antenna group has the RF signal selector, the load of the interrogator body is reduced in comparison to the forth embodiment, and more antenna groups can be installed. Accordingly, the processable number of the transponders can be increased to a great extent.

Figure 10:
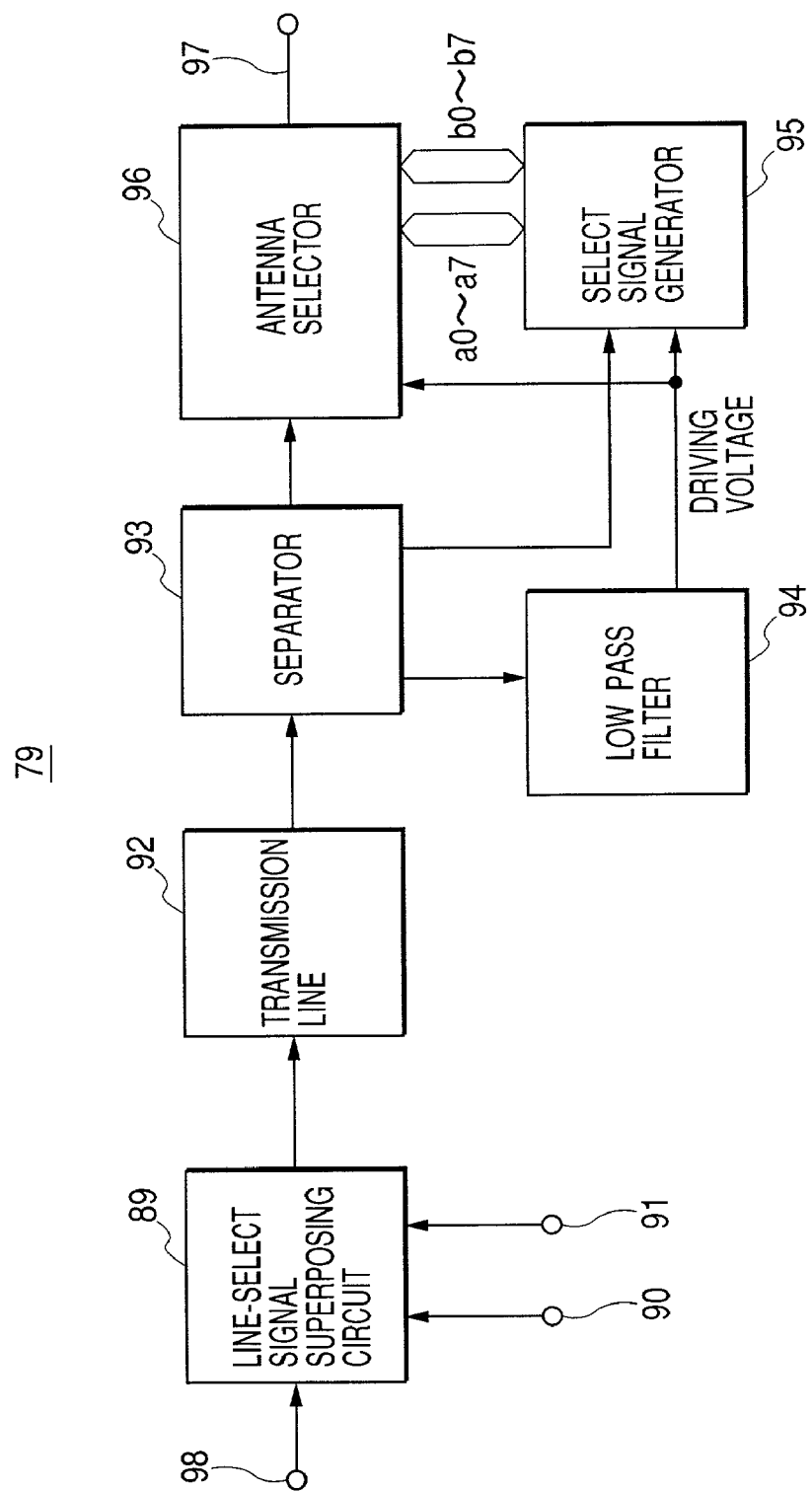
FIG. 10 is a block diagram explaining an example of an RF signal line controller used in the interrogator in FIG. 9.

FIG. 10 illustrates an example of the RF signal line controller 79. Since the antenna switching circuits and the peripheral circuits thereof, which constitute each RF signal selector, are disposed close to each of the antennas, the supply voltage that drives a switching control signal and each circuit is preferably supplied through one RF signal line together with the RF signal. The line controller 79 in FIG. 10 is configured in view of the above.

In FIG. 10, 89 signifies a switching signal superposing circuit tat superposes a dc voltage from a power supply terminal 90 and a control signal from a control terminal 91 on an RF signal from an RF signal input/output terminal 98, and 92 signifies a transmission line. Further, 93 signifies a switching signal separation circuit that separates the RF signal, control signal, and supply voltage from the signal sent by the transmission line 92, 94 a low pass filter that omits undesired RF components from the supply voltage that the switching signal separation circuit 93 has separated, 95 a switching signal generation circuit that generates switching signals to the RF signal selectors a0–a7 and the RF signal selectors b0–b7, on the basis of the control signal that the switching signal separation circuit 93 has separated, and 96 an antenna switching circuit, which is composed of the selectors a0–a7 and the selectors b0–b7.

The low pass filter 94 supplies the supply voltage to the switching signal generation circuit 95 and the antenna switching circuit 96. The RF signal to the antenna to be switched is inputted/outputted through the RF signal input/output terminal 97. Only one of the sleeve antennas of the interrogator antenna is selectively connected to the RF signal line 78 (transmission line 92), by the switching, whereby communications between plural transponders become possible.

Figure 11:
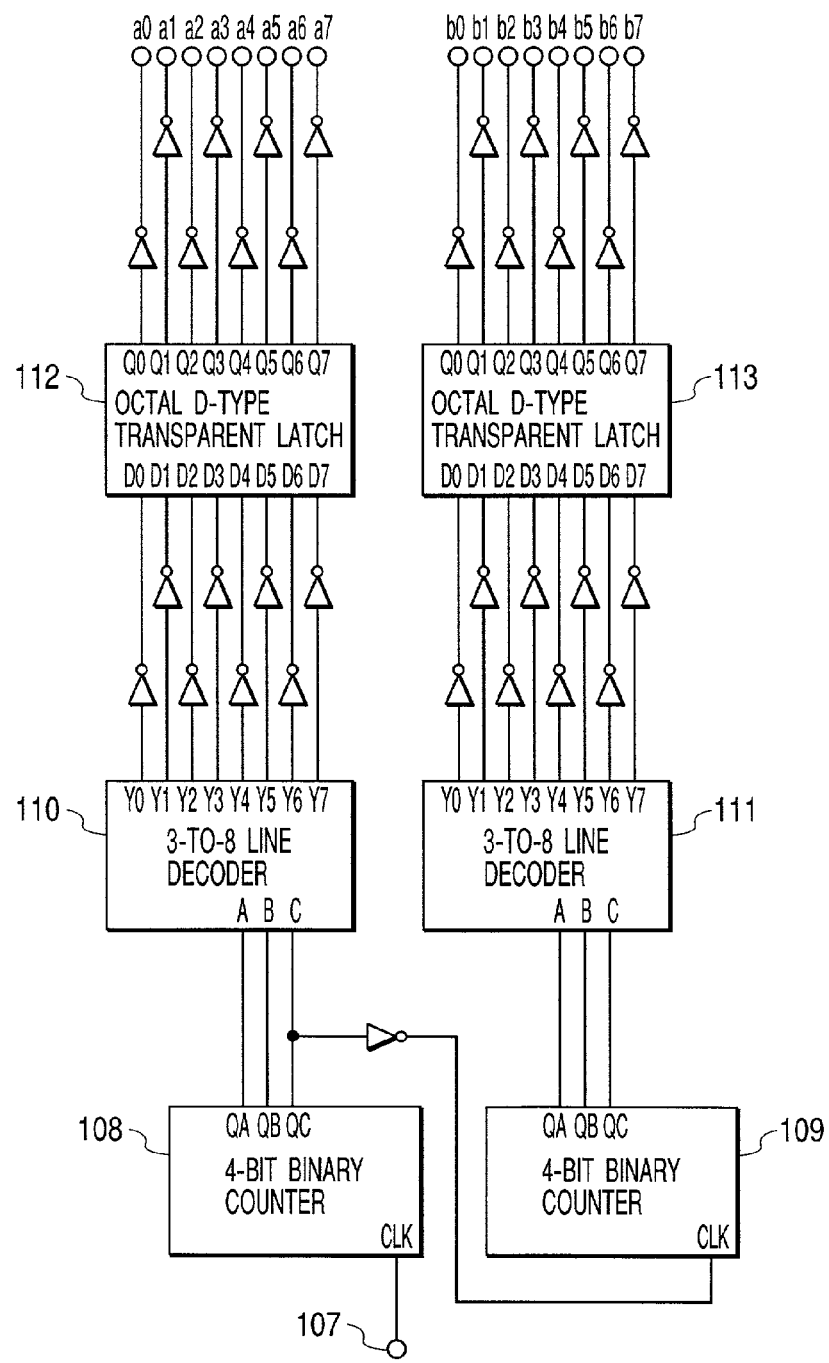
FIG. 11 is a block diagram explaining an example of a switching signal generation circuit used in the RF signal line controller in FIG. 10.

FIG. 11 illustrates an example of the switching signal generation circuit 95. In FIG. 11, 107 signifies a switching signal input terminal, 108, 109 signify a 4-bit binary counter, 110, 111 a 3-to-8 line decoder, and 112, 113 an octal D-type latch.

As an arbitrary number of pulses are inputted as the control signal from the switching signal input terminal 107, the switching signal input terminal 108 counts the number of the pulses, and the output signal at the third bit is inputted to the clock input CLK of the 4 bit binary counter 109. The 3-bit outputs QA, QB, QC of the 4-bit binary counter 108 pass through the 3-to-8 line decoder 110 and the octal D-type latch 112 to be converted into the switching signals that drive the selectors a0–a7 provided to the sleeve antennas. The switching signals are capable of switching plural (8, at the maximum) sleeve antennas.

The 4-bit binary counter 109 increments one count every 8 counts of the 4-bit binary counter 108. The 3-bit outputs QA, QB, QC of the 4-bit binary counter 109 pass through the 3-to-8 line decoder 111 and the octal D-type latch 113 to be converted into the switching signals that drive the selectors b0–b7 provided to the antenna groups. The switching signals are capable of switching plural (8, at the maximum) antenna groups.

Figure 12:
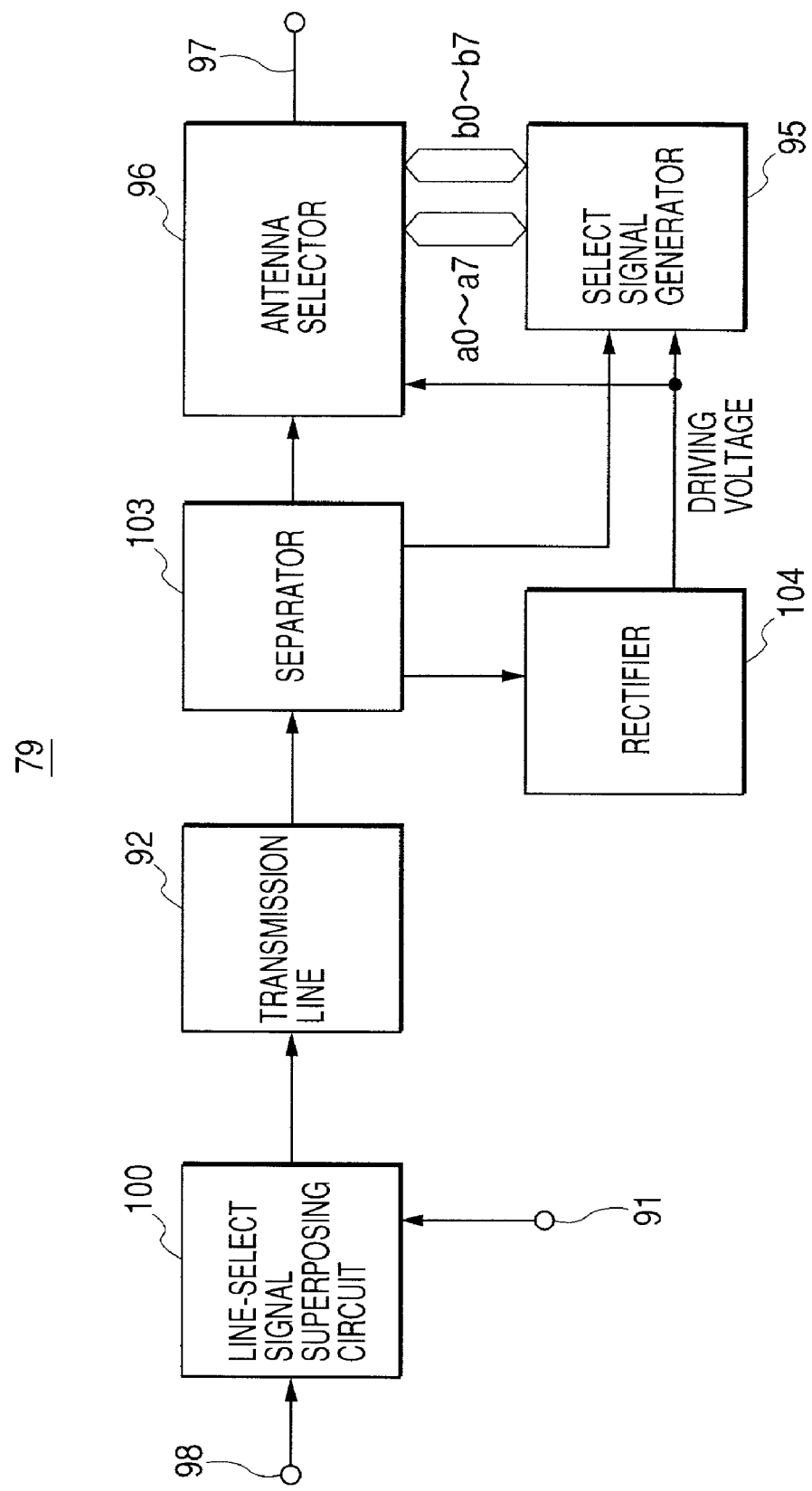
FIG. 12 is a block diagram explaining another example of the RF signal line controller used in the interrogator in FIG. 9.

Next, FIG. 12 illustrates another example of the RF signal line controller 79. In this example, rectifying a part of the RF signal generates the power supply voltage. In FIG. 12, 100 signifies a switching signal superposing circuit tat superposes a control signal from the control terminal 91 on the RF signal from the RF signal input/output terminal 98. 103 signifies a switching signal separation circuit that supplies an RF signal to the antenna switching circuit 96 and a rectifying circuit 104 by an internal coupling circuit thereof, and separates the control signal superposed on the RF signal. The rectifying circuit 104 rectifies an inputted RF signal to generate a dc supply voltage to be supplied to the switching signal generation circuit 95 and the antenna switching circuit 96. The other circuits are the same as those shown in FIG. 10, and the explanation will be omitted. Also in this example, only one of the sleeve antennas of the interrogator antenna is selectively connected to the RF signal line 78, by the switching, whereby communications between plural transponders become possible.

Figure 13:
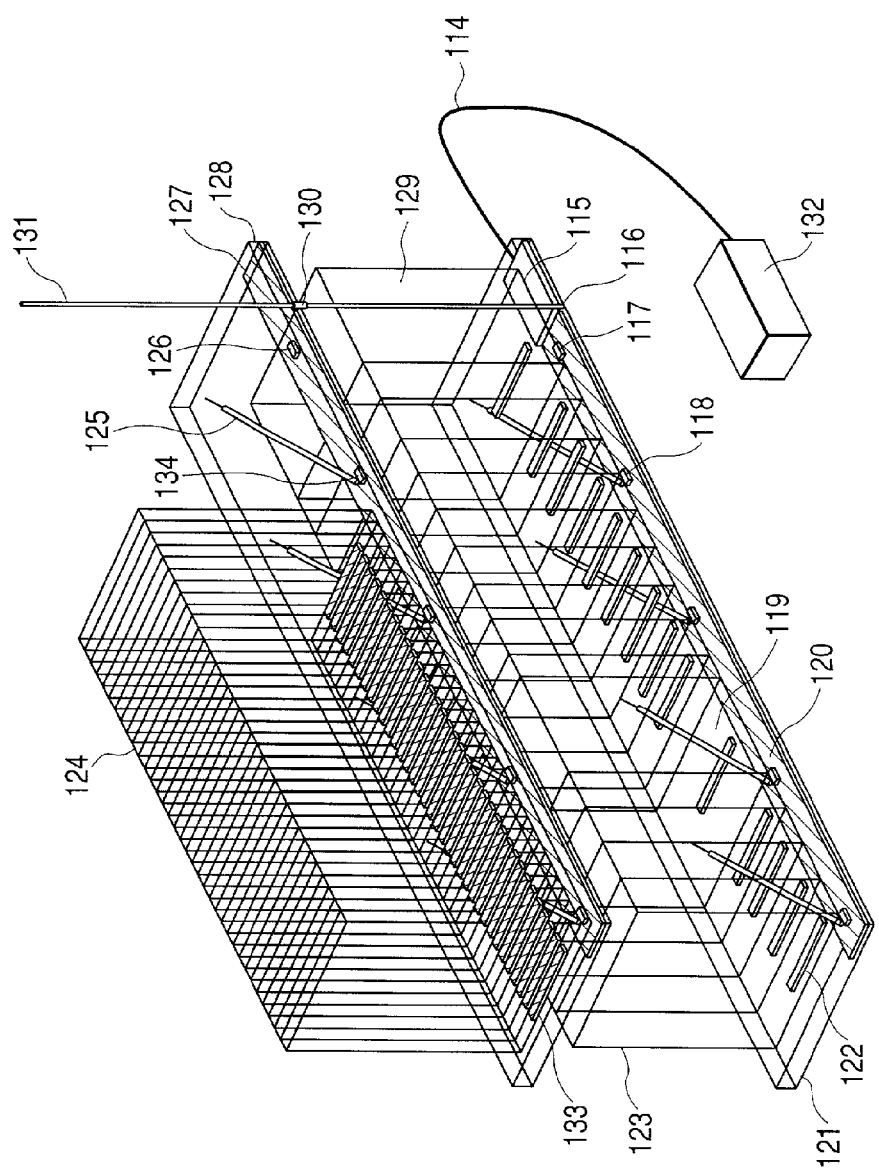
FIG. 13 is a perspective view explaining a stock control system applying the interrogator antennas as the sixth embodiment of the invention.

FIG. 13 illustrates a stock control system as the sixth embodiment of the invention, in which the interrogator antennas shown in FIG. 9 are applied to a rack of plural shelves that controls the reception and stock of managed goods. The managed goods includes a file and document, CD (Compact Disk), DVD (Digital Versatile Disk), etc., and a control terminal controls the goods using an identified result by the interrogator.

FIG. 13 illustrates the shelves up to two. In FIG. 13, 121, 128 each denote a shelf board on the lower shelf, and a shelf board on the upper shelf; the antenna group is installed on each shelf board, and an interrogator 115 is installed on the right near side of the lower shelf board 121. The interrogator 115 has a control terminal 132 connected thereto, through a control line 114.

The antenna group installed on the shelf board 121 possesses a board 120, four sleeve antennas 119 embedded in the board 120, an RF signal selector 118 for the sleeve antennas 119, and an RF signal selector 117 for the antenna group. The managed goods are placed on the antenna group, which are illustrated with the symbol 123 in FIG. 13, and as described later, rectangular transponders 122 are applied on the managed goods 123. And, the RF signal line and the ground plane are formed on the board 120, which are not illustrated in the drawing.

Similarly, the antenna group installed on the shelf board 128 possesses a board 127, four sleeve antennas 125 embedded in the board 127, an RF signal selector 134 for the sleeve antennas 125, and an RF signal selector 126 for the antenna group. The managed goods are placed on the antenna group, which are illustrated with the symbol 124 in FIG. 13, and rectangular transponders 133 are applied on the managed goods 124. And, the RF signal line and the ground plane are formed on the board 127, which are not illustrated in the drawing. The board 127 and the RF signal line thereon are connected to the interrogator 115 through RF coaxial cables 129, 131 connected to RF coaxial connectors 116, 130. In this embodiment, the interrogator 115 includes the function of the switching signal superposing circuit of the RF signal line controller.

Figure 14:
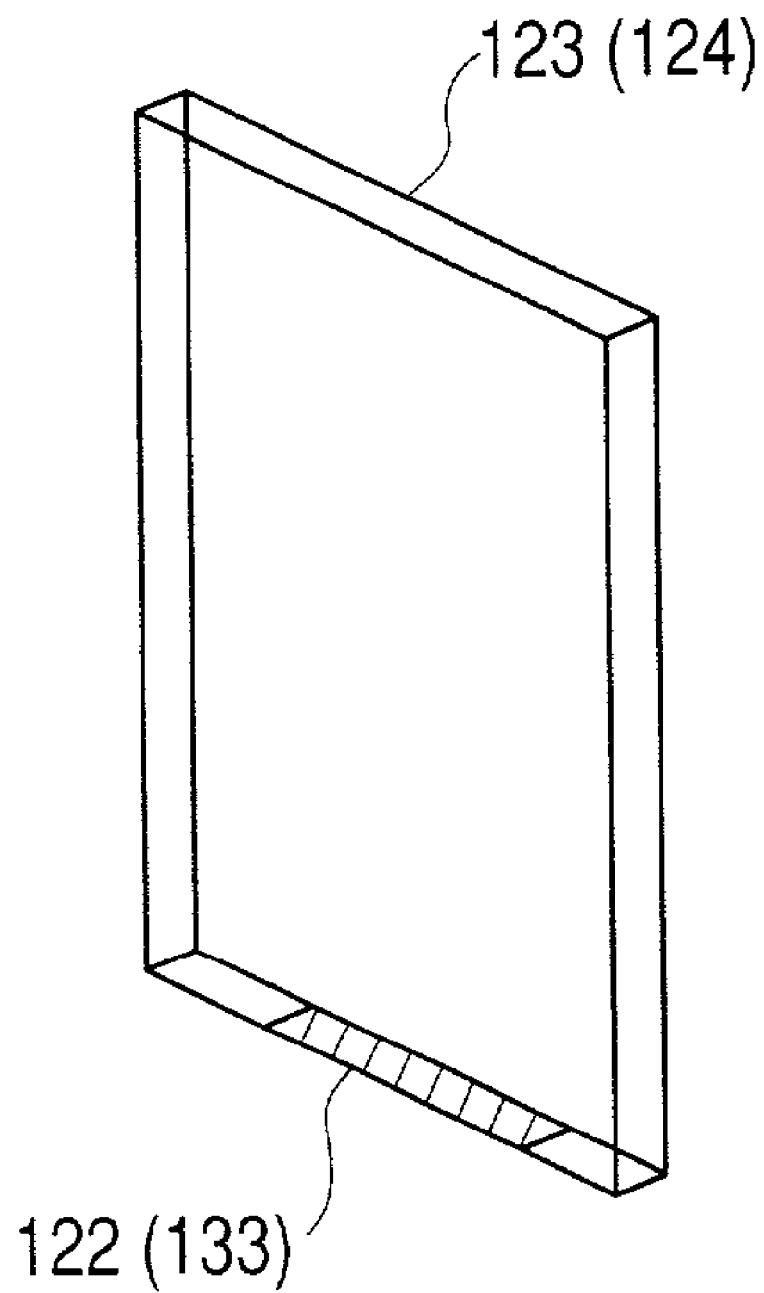
FIG. 14 is a perspective view explaining managed goods in the sixth embodiment in FIG. 13.

FIG. 14 illustrates a form of the managed goods 123, 124. The managed goods 123 (124) has the form, such as a file, document, CD, DVD, and the like. The rectangular transponders 122 (133) are applied on the underside of the managed goods 123 (124) so as to face to the sleeve antennas 119, 125.

In this embodiment, the RF signal selectors 117, 126 select either of the antenna groups installed on the shelf boards 121, 128; further, the RF signal selectors 118, 134 select either one of the sleeve antennas 119, 125. And, the number of the antennas 119, 125 installed and the location thereof recognizes that a managed goods of which identification number stays at which location of which shelf board. Thus, a further subdivided location becomes possible, and a fine stock control becomes possible accordingly.

And, in view of the distinctive features of the invention, it is widely applicable to the control of goods, such as a goods control in a shop, a files and books control in an office, etc., in addition to the above stock control.

Now, if an optical indicator such as an LED is used which lights or flickers by the switching signal in combination with the RF signal selectors 117, 126, and the RF signal selectors 118, 134, it will be possible to confirm by visual observation the location of a managed goods on which a rectangular transponder for exchanging data is attached.

Figure 15A:
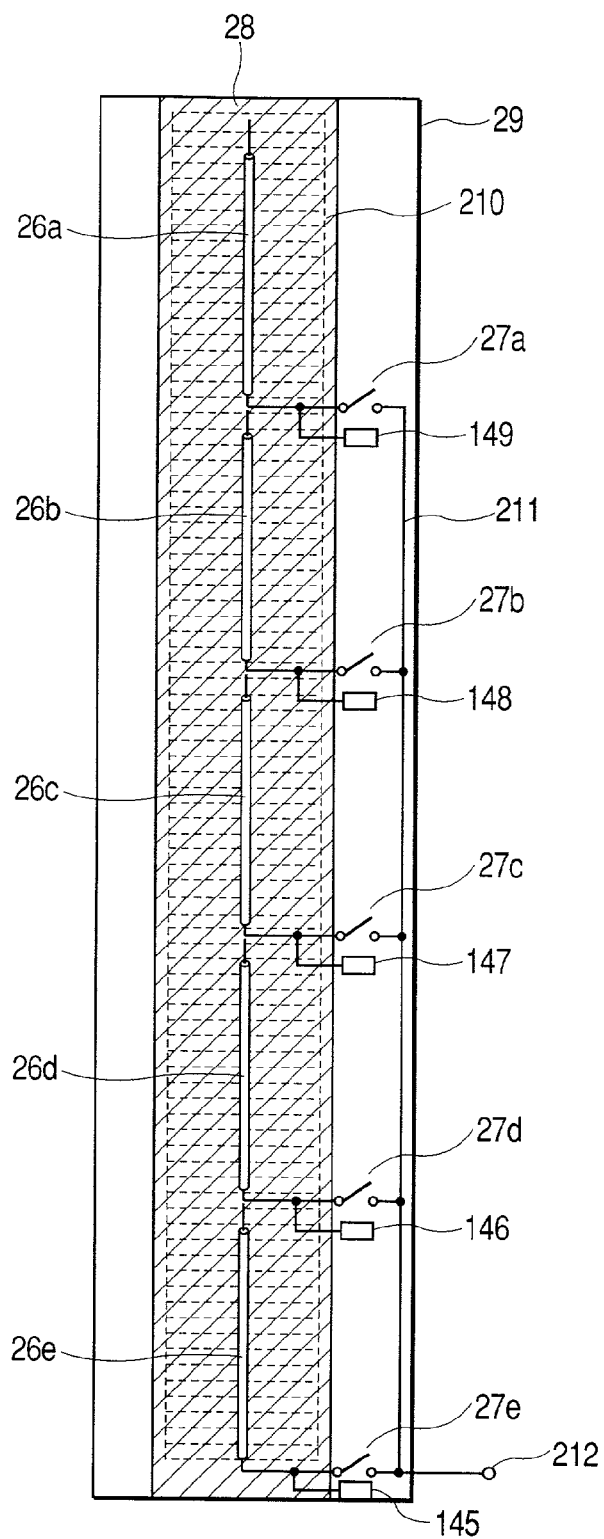
FIG. 15(a) illustrates a plan view that explains an interrogator as the seventh embodiment relating to the invention.
Figure 15B:
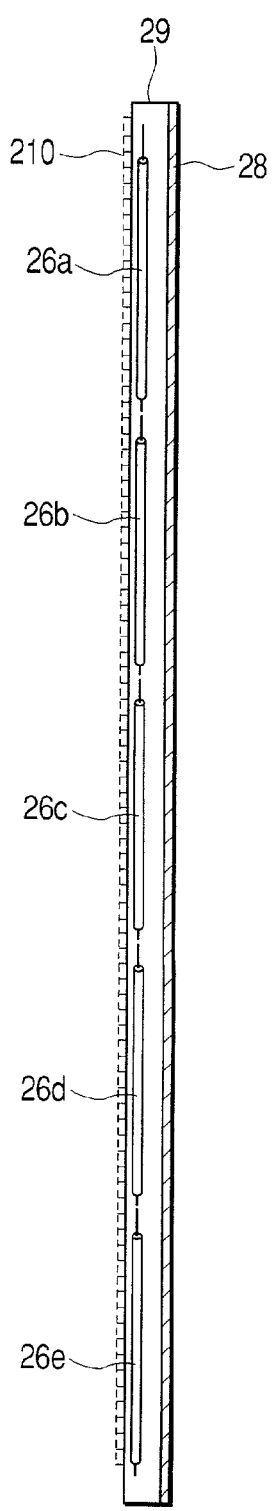
FIG. 15(b) illustrates a side view that explains an interrogator as the seventh embodiment relating to the invention.

FIGS. 15(a) and 15(b) illustrate an interrogator using such an optical indicator, as the seventh embodiment of the invention. FIG. 15(a) and FIG. 15(b) are the plan view and the side view, respectively. The basic structure of the interrogator antenna is the one from the second embodiment shown in FIGS. 6(a) and 6(b); and indicators 145–149 are each connected to the sleeve antenna sides of the RF signal selectors 27a–27e. Naturally, any of the interrogator antennas in the first through third embodiments and the antenna groups in the fourth through sixth embodiments can be the basic structure of the interrogator antenna to which the indicators 145–149 are connected.

One of the indicators 145–149 lights or flickers, when one of the RF signal selectors 27a–27e corresponding to the indicator is selected, whereby the selected sleeve antenna can be confirmed by visual observation.

Further, the indicators can be attached to the RF signal selectors b0–b7 in FIG. 9, as well as to the RF signal selectors 117, 126 in FIG. 13, in addition to the RF signal selectors 27a–27e. When one of the selectors is selected, the corresponding indicator lights or flickers, which enables the confirmation of a selected antenna group by visual observation.

Next, FIGS. 16(a) and 6(b) illustrate an interrogator using a sound source instead of an optical indicator, as the eighth embodiment of the invention. FIG. 16(a) and FIG. 16(b) are the plan view and the side view, respectively. Sound sources 165–169 are each connected to the sleeve antenna sides of the RF signal selectors 27a–27e.

The sound sources 165–169 are made up with piezoelectric buzzers that emit audible sounds, and so forth. When any one of the RF signal selectors 27a–27e is selected, the sound source corresponding to the selected one of the selectors emits an audible sound; accordingly, it becomes possible to confirm the selected sleeve antenna by hearing the sound. Naturally, any of the interrogator antennas in the first through third embodiments and the antenna groups in the fourth through sixth embodiments can be the basic structure of the interrogator antenna to which the sound sources 165–169 are connected.

Further, the sound sources can be attached to the RF signal selectors b0–b7 in FIG. 9, as well as to the RF signal selectors 117, 126 in FIG. 13, in addition to the RF signal selectors 27a–27e. When one of the selectors is selected, confirming the sound of the sound source connected to the selected selector permits the confirmation of a selected antenna group.

Further, it is also possible to combine the indicators and the sounds source. It is possible to properly use the indicators and the sound sources, in a case suitable for making sounds and a case suitable for emitting lights, and also possible to use both at the same time.

According to the invention, the antenna group is able to secure an intensified and uniform electromagnetic energy concentrated on the areas near the antenna elements, which accomplishes an interrogator that enables information exchange with multiple transponders in a shorter distance of communication. Using the interrogator of the invention will achieve movable body identification equipment such as a goods management system that identifies multiply arrayed goods, and so forth.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An interrogator that forms movable body identification equipment together with plural transponders, comprising:
   plural sleeve antennas provided as an antenna that executes an information exchange with the plural transponders by a radio communication using a microwave band;
   a transmitting circuit that modulates data into an RF signal, the RF signal being transmitted out via said plural sleeve antennas;
   a receiving circuit that receives signals via said plural sleeve antennas; and
   RF signal selectors that select one of said plural sleeve antennas, each of the RF signal selectors being in correspondence with each of said plural sleeve antennas.

2. An interrogator according to claim 1, wherein a switching signal to drive the RF signal selector is created on the basis of a pulse count signal being superposed on an RF signal outputted from the interrogator.

3. An interrogator according to claim 1, further comprising an indicator that operates synchronously with the RF signal selector, in combination with the selector.

4. An interrogator according to claim 1, further comprising a sound source that operates synchronously with the RF signal selector, in combination with the selector.

5. An interrogator according to claim 1, wherein the transponders of a flat rectangular shape are arrayed close to said plural sleeve antennas.

6. An interrogator according to claim 1, wherein the plural sleeve antennas are divided into plural antenna groups, and an RF signal from the interrogator is supplied in parallel to the plural antenna groups.

7. An interrogator according to claim 1, wherein the plural sleeve antennas are divided into plural antenna groups, and an RF signal from the interrogator is supplied in parallel to the plural antenna groups, through another RE signal selector that selects one group of the plural antenna groups.

8. An interrogator that forms movable body identification equipment together with plural transponders, comprising:
   plural sleeve antennas provided as an antenna that executes an information exchange with the plural transponders by a radio communication using a microwave band;
   a transmitting circuit that modulates data into an RF signal, the RF signal being transmitted out via plural sleeve antennas;
   a receiving circuit that receives signals via said plural sleeve antennas; and
   a grounded conductive plate disposed close to said plural sleeve antennas, on a side opposite to a side on which the transponders related to said plural sleeve antennas are disposed; and
   RF signal selectors that select one of the plural sleeve antennas, each of the RF signal selectors being in correspondence with each of said plural sleeve antennas.

9. An interrogator according to claim 8, wherein the transponders of a flat rectangular shape are arrayed close to said plural sleeve antennas.

10. A goods management system comprising:
    plural transponders of a flat rectangular shape that are each attached on sides of each of plural goods;
    an interrogator that executes an information exchange with the plural transponders by a radio communication using a microwave band; and
    a management terminal that controls the plural goods, using information from the interrogator acquired by the information exchange;
    wherein the interrogator includes: plural sleeve antennas for exchanging information with the plural transponders; a grounded conductive plate disposed close to the plural sleeve antennas, on a side opposite to a side on which the plural transponders related to the plural sleeve antennas are disposed; and RF signal selectors that select one of the plural sleeve antennas, and
    wherein the transponders are arrayed close to the plural sleeve antennas.

11. A goods management system according to claim 10, wherein the plural sleeve antennas are divided into plural antenna groups, and an RF signal from the interrogator is supplied in parallel to the plural antenna groups, through another RF signal selector that selects one group of the plural antenna groups.

12. A goods management system according to claim 11, further comprising an indicator that operates synchronously with the RF signal selector and another RF signal selector, in combination with the selector and another selector.

13. A goods management system according to claim 11, further comprising a sound source that operates synchronously with the RF signal selector and another RF signal selector, in combination with the selector and another selector.

* * * * *